(12) United States Patent
Powers et al.

(10) Patent No.: US 11,323,362 B2
(45) Date of Patent: May 3, 2022

(54) RESILIENCE TO SINGLE EVENT UPSETS IN SOFTWARE DEFINED NETWORKS

(71) Applicant: Schweitzer Engineering Laboratories, Inc., Pullman, WA (US)

(72) Inventors: David J. Powers, Redmond, WA (US); Kylan T. Robinson, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/988,201

(22) Filed: Aug. 7, 2020

(65) Prior Publication Data
US 2022/0045941 A1 Feb. 10, 2022

(51) Int. Cl.
| | |
|---|---|
| *H04L 45/00* | (2022.01) |
| *H04L 45/64* | (2022.01) |
| *H04L 49/00* | (2022.01) |
| *H04L 49/55* | (2022.01) |
| *H04L 45/30* | (2022.01) |

(52) U.S. Cl.
CPC ............ *H04L 45/38* (2013.01); *H04L 45/306* (2013.01); *H04L 45/64* (2013.01); *H04L 49/557* (2013.01); *H04L 49/70* (2013.01)

(58) Field of Classification Search
CPC ....... H04L 45/38; H04L 45/306; H04L 49/70; H04L 49/557; H04L 45/64; H04L 2209/60
See application file for complete search history.

(56) References Cited

U.S. PATENT DOCUMENTS

| | | | |
|---|---|---|---|
| 3,946,281 | A | 3/1976 | Liona |
| 4,296,475 | A | 10/1981 | Nederlof |
| 4,493,081 | A | 1/1985 | Schmidt |
| 4,521,872 | A | 1/1985 | Sawada |
| 4,506,362 | A | 3/1985 | Morley |
| 4,530,431 | A | 7/1985 | Spurlin |
| 4,534,031 | A | 8/1985 | Jewer |
| 4,769,735 | A | 9/1988 | Ueda |
| 5,276,690 | A | 1/1994 | Lee |
| 5,533,195 | A | 7/1996 | LaRochelle |

(Continued)

OTHER PUBLICATIONS

Zimmerman, Karl; Haas, Derrick: "Impacts of Single Event Upsets on Protective Relays" Mar. 2019.

*Primary Examiner* — Mohamed A Kamara
(74) *Attorney, Agent, or Firm* — Jared L. Cherry

(57) ABSTRACT

The present disclosure pertains to improving resilience to single event upsets ("SEUs") in a software-defined network ("SDN"). In one embodiment, a system may include a communications interface to receive and transmit a data packet. A primary data flow repository may store a plurality of communication flows to be used to route the data packet. A secondary data flow repository may store a subset of communication flows to be used to route a data packet. A system may search the plurality of communication flows in the primary data flow repository based on a criteria associated with the data packet. If no communication flow satisfies the criteria, a secondary data flow repository may be searched. The data packet may be routed according to a communication flow in the secondary data flow repository. The communication flow from the secondary data flow repository may be duplicated in the primary data flow repository.

23 Claims, 5 Drawing Sheets

(56) References Cited

U.S. PATENT DOCUMENTS

| | | |
|---|---|---|
| 5,555,250 A | 9/1996 | Walker |
| 5,627,716 A | 5/1997 | Lagree |
| 5,844,918 A | 12/1998 | Kato |
| 5,856,903 A | 1/1999 | Smith |
| 5,872,722 A | 2/1999 | Oravetz |
| 5,917,841 A | 6/1999 | Kodama |
| 5,974,529 A | 10/1999 | Zumkehr |
| 5,987,393 A | 11/1999 | Stinson |
| 6,055,145 A | 4/2000 | Lagree |
| 6,138,253 A | 10/2000 | Buzsaki |
| 6,195,767 B1 | 2/2001 | Adams |
| 6,292,911 B1 | 9/2001 | Swanson |
| 6,397,355 B1 | 5/2002 | Curtis |
| 6,453,440 B1 | 9/2002 | Cypher |
| 6,457,146 B1 | 9/2002 | Keen |
| 6,473,880 B1 | 10/2002 | Cypher |
| 6,477,682 B2 | 11/2002 | Cypher |
| 6,594,774 B1 | 7/2003 | Chapman |
| 6,615,376 B1 | 9/2003 | Olin |
| 6,839,868 B1 | 1/2005 | Pignol |
| 6,874,107 B2 | 3/2005 | Lesea |
| 6,886,116 B1 | 4/2005 | MacLellan |
| 6,973,613 B2 | 12/2005 | Cypher |
| 6,983,414 B1 | 1/2006 | Duschatko |
| 7,852,107 B1 * | 12/2010 | Sundararajan ... H03K 19/00338 326/46 |
| 8,024,639 B2 | 9/2011 | Cooper |
| 8,441,768 B2 | 5/2013 | Kasztenny |
| 9,007,731 B2 | 4/2015 | Finney |
| 9,686,125 B2 | 6/2017 | Smith |
| 9,769,060 B2 | 9/2017 | Dearien |
| 10,127,110 B2 | 11/2018 | Baptist |
| 10,135,465 B2 | 11/2018 | Parthasarathy |
| 11,012,542 B2 * | 5/2021 | Wang .................. H04L 47/2483 |
| 2003/0097628 A1 | 5/2003 | Ngo |
| 2004/0153215 A1 | 8/2004 | Kearney |
| 2004/0153902 A1 | 8/2004 | Machado |
| 2005/0289407 A1 | 12/2005 | Noda |
| 2005/0289442 A1 | 12/2005 | Derner |
| 2006/0114627 A1 | 6/2006 | Wong |
| 2008/0080114 A1 | 4/2008 | Schweitzer |
| 2008/0155293 A1 | 6/2008 | Skendzic |
| 2009/0158088 A1 * | 6/2009 | Hillman ............. G06F 11/1687 714/11 |
| 2014/0269683 A1 * | 9/2014 | Bhagavathiperumal ..................... H04L 49/25 370/355 |
| 2015/0188810 A1 * | 7/2015 | Salkintzis ............... H04L 45/38 370/328 |
| 2018/0097723 A1 * | 4/2018 | Chinthalapati ......... H04L 47/24 |
| 2020/0036624 A1 * | 1/2020 | Michael ................. H04L 45/22 |
| 2020/0142775 A1 * | 5/2020 | Kotak ................ G06F 11/0736 |
| 2020/0329047 A1 | 10/2020 | Powers |

* cited by examiner

Figure 4

| Data Flow | Ingress Port | MAC Source Address | MAC Destination | IP Source Address | IP Destination | Service Type | Include in Secondary Repository? | Instructions |
|---|---|---|---|---|---|---|---|---|
| 1 | 1 | * | * | * | * | * | Y | Forward to port 10 |
| 2 | * | ::02A1:032B | ::034A:23B1 | * | * | * | Y | Forward to port 2 |
| 3 | * | * | * | 10.2.3.1 | * | * | N | Forward to 10.1.8.1 |
| 4 | 3 | * | * | * | * | GOOSE | Y | Forward to port 8 |
| 5 | * | * | * | * | * | * | N | Drop packet |

400

RESILIENCE TO SINGLE EVENT UPSETS IN SOFTWARE DEFINED NETWORKS

TECHNICAL FIELD

The present disclosure pertains to systems and methods for improving resilience to single event upsets ("SEUs") in a software-defined network ("SDN"). More specifically, but not exclusively, various embodiments consistent with the present disclosure may be used in network devices that route traffic in SDNs.

BRIEF DESCRIPTION OF THE DRAWINGS

Non-limiting and non-exhaustive embodiments of the disclosure are described, including various embodiments of the disclosure, with reference to the figures, in which:

FIG. 4 illustrates a plurality of data flows that may be implemented in a network device and may permit selective inclusion of data flows in a secondary repository consistent with embodiments of the present disclosure.

DETAILED DESCRIPTION

Figure 1:
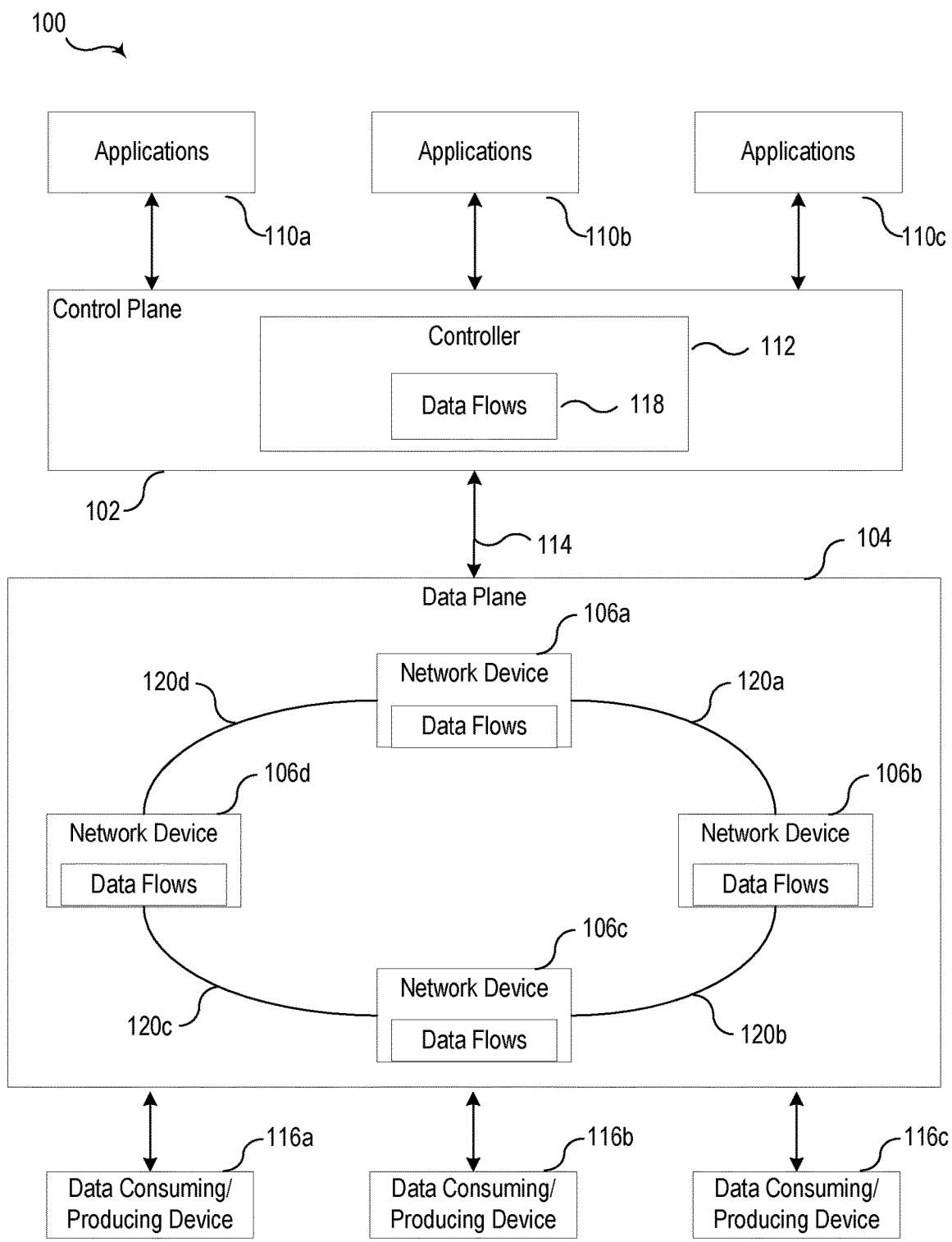
FIG. 1 illustrates a conceptual representation of an SDN system including a control plane, a data plane, and a plurality of data consumer/producer devices consistent with embodiments of the present disclosure.

SDN networking technologies offer a variety of advantages, such as deny-by-default security, latency guarantees, deterministic transport capabilities, redundancy, and failover planning, etc. An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to optimize the usage of network resources by creating specific data flows through the communication network. A data flow, as the term is used herein, refers to a set of parameters used to match and take action based on network packet contents. Data flows may permit dedicated paths based on a variety of criteria that offer significant control and precision to operators of the network. In contrast, in large traditional networks, trying to match a network-discovered path with an application-desired data path may be a challenging task involving changing configurations in many devices. To compound this problem, the management interfaces and feature sets used on many devices are not standardized. Further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) includes both control logic and data forwarding logic. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or a Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane. The controller may set forwarding tables in network devices that establish how data is to be routed. This enables centralized configuration and management of a network. In addition to simplifying management of a network, an SDN architecture may also enable monitoring and troubleshooting features that may be beneficial for use in an electric power distribution system, including but not limited to: mirroring a data-selected flow rather than mirroring a whole port; alarming on bandwidth when it gets close to saturation; providing metrics (e.g., counters and meters for quality of service, packet counts, errors, drops, or overruns, etc.) for a specified flow; and permitting the monitoring of specified applications rather than monitoring based on virtual local area networks (VLAN) or media access control (MAC) addresses.

An SEU is a change in an electronic device (e.g., a microprocessor, semiconductor memory, etc.) caused by a transitory event. The transitory event may cause a state change in a logic element or memory location (e.g., a memory bit) as a result of the charge created by ionization in or close to a node of the device. SEUs may be caused by solar events, cosmic rays, nuclear reactions, etc.

SEUs may interfere with the operation of SDNs. For example, an SEU may affect a portion of an SDN device's memory that stores rules for routing traffic. If a rule becomes corrupted, data packets routed according to the rule may be discarded or routed to a controller. Such data packets may contain information that is critical to the operation of the system in which the affected device is operating.

The likelihood of an SEU affecting a device may depend on both the susceptibility of the device and the time during which the device is potentially exposed. Memory devices, such as those that store flow rules in an SDN device, are susceptible to changes (e.g., an alteration of a bit) caused by SEUs. The likelihood of a device experiencing an SEU increases based on its time in service. Equipment used in electrical power systems and other critical infrastructure may be expected to operate reliably for many years or even decades. Over long periods, the potential for maloperation cause by an SEU increases.

The inventors of the present disclosure have recognized that the potential for maloperation due to an SEU may be reduced by redundantly storing some or all of the configuration of an SDN device. The redundant storage may substantially reduce the likelihood of a critical rule for routing data being affected by SEU. For example, if the likelihood of a critical rule being affected are 1/x, the likelihood the same rule being affected in two unique memory locations are $1/x^2$. For example, if the likelihood of an alteration of a data flow in a memory location is 1 in 2 million, the likelihood of the same data flow being altered in two separate memory locations is 1 in 4 trillion.

In various embodiments consistent with the present disclosure, some or all of a device's configuration is stored in multiple locations. A redundancy subsystem may detect and correct changes caused by SEUs. Upon detection of a change, the corrupted configuration information be may purged and replaced using information from an alternate location. In other embodiments, the corrupted information may be skipped, marked as corrupted, repaired in place, and/or deactivated. When a change is detected, the redundant information may be used to route data, thus ensuring that the device continues to route critical traffic. The redundancy system may operate more slowly than the operational switching fabric. The inventors of the present application have recognized that certain embodiments of the present disclosure may address the inability of the redundancy system to repair flows sufficiently quickly for certain time-sensitive applications.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic devices) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a conceptual representation of an SDN system 100 including a control plane 102, a data plane 104, and a plurality of data consumer/producer devices 116a-116c consistent with embodiments of the present disclosure. The control plane 102 directs the flow of data through the data plane 104. More specifically, an SDN controller 112 may communicate with the plurality of network devices 106a-106d via an interface 114 to communicate data flows 118 that are implemented by each network device 106a-106d. The controller 112 may specify rules for routing traffic through the data plane 104 based on a variety of criteria.

Each network device 106a-106d may store a plurality of data flows used to route traffic. In one specific embodiment, the data flows may be stored in or implemented by a Field Programmable Gate Array (FPGA). An FPGA may be a logical choice for use in network devices because FPGAs may provide both the configurability and speed suitable for SDN applications. The data flows may be received from controller 112. Corruption of the data flows may result in data packets being misdirected or dropped. Misdirecting or dropping data packets may result in maloperation of equipment that utilizes information in the misdirected or dropped data packets.

As illustrated, the data plane 104 includes a plurality of network devices 106a-106d in communication with one another via a plurality of physical links 120a-120d. In various embodiments, the network devices 106a-106d may be embodied as switches, multiplexers, and other types of network devices. The physical links 120a-120d may be embodied as Ethernet, fiber optic, and other forms of data communication channels. As illustrated, the physical links 120a-120d between the network devices 106a-106d may provide redundant connections such that a failure of one of the physical links 120a-120d is incapable of completely blocking communication with an affected network device. In some embodiments, the physical links 120a-120d may provide an N−1 redundancy or better.

The data consuming/producing devices 116a-116c may represent a variety of devices that produce or consume data within an electric power transmission and distribution system. For example, data consuming/producing devices may be embodied as a pair of transmission line relays configured to monitor an electrical transmission line. The transmission line relays may monitor various aspects of the electric power flowing through the transmission line (e.g., voltage measurements, current measurements, phase measurements, synchrophasors, etc.) and may communicate the measurements to implement a protection strategy for the transmission line. Traffic between the transmission line relays may be routed through the data plane 104 using a plurality of data flows implemented by controller 112. Of course, data consuming/producing devices 116a-116c may be embodied by a wide range of devices consistent with embodiments of the present disclosure.

Applications 110a-110c may represent a variety of applications operating in an application plane. In the SDN architecture illustrated in FIG. 1, controller 112 may expose an application programming interface (API) that applications 110a-110c can use to configure the data plane 104. In this scenario, controller 112 may act as an interface to the data plane 104 while the control logic resides in the applications 110a-110c. The configuration of controller 112 and applications 110a-110c may be tailored to meet a wide variety of specific needs.

Figure 2A:
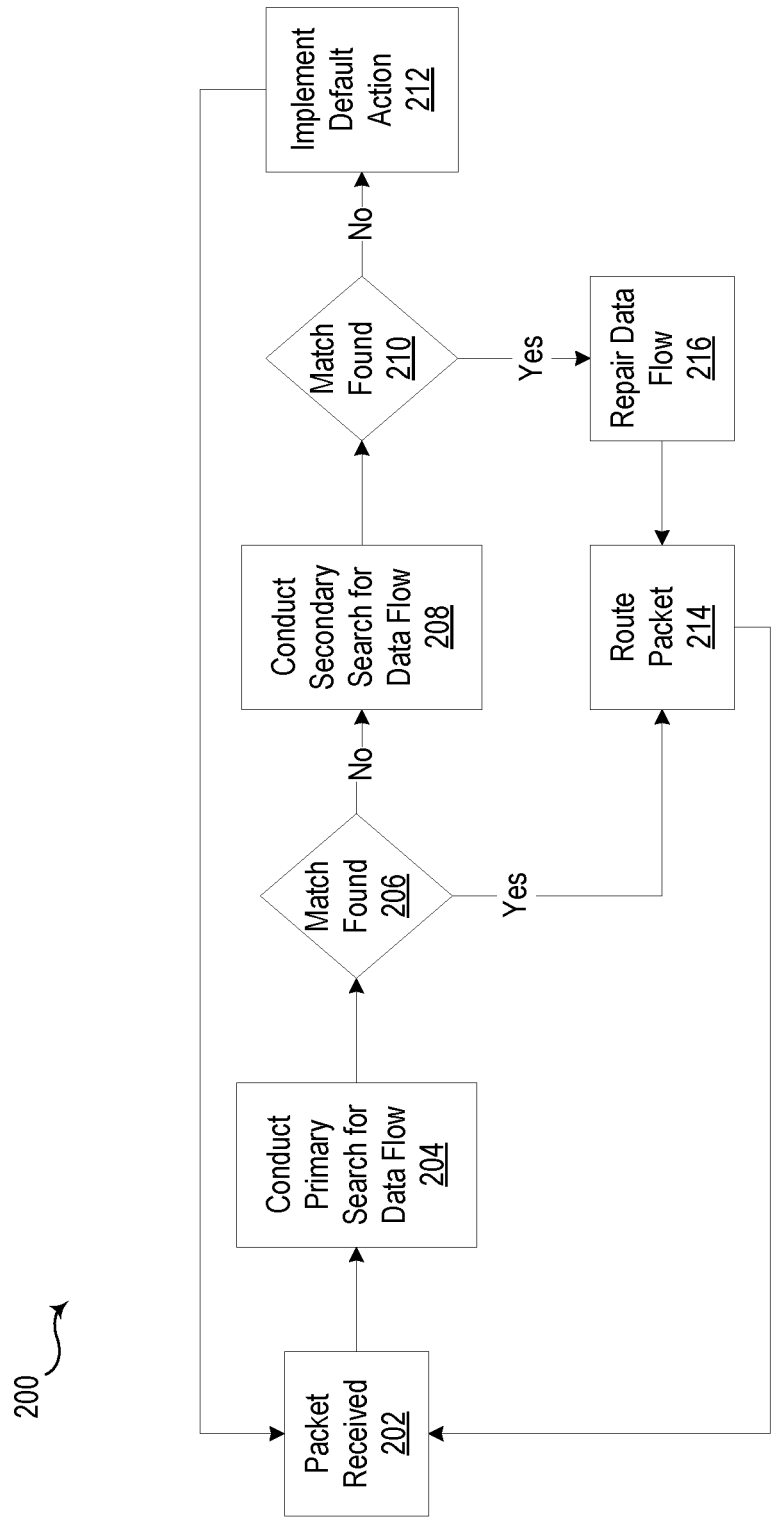
FIG. 2A illustrates a flow chart of a method for improving resilience to SEUs in an SDN consistent with embodiments of the present disclosure.

FIG. 2A illustrates a flow chart of a method 200 for improving resilience to SEUs in an SDN consistent with embodiments of the present disclosure. At 202, a data packet may be received by a routing device in an SDN. At 204, the routing device may conduct a primary search for a data flow used to route the data packet. Data flows may utilize a variety of criteria to route packets, such as an internet protocol ("IP") address, media access control ("MAC") address, priority, type, etc. Upon receiving the data packet, the routing device may search for applicable data flows based on one or more criteria of the received packet. If a match is found at 206, the data packet may be routed at 214 according to the data flow.

If a matching data flow is not found at 206, the routing device may, at 208, conduct a secondary search. In various embodiments, the secondary search may involve searching an alternate memory device or an alternate memory location. The alternate memory device or alternate memory location may comprise a subset of the data flows or all of the data flows used by the routing device. The alternate memory device or alternate memory location may comprise other information (e.g., configuration information) related to the operation of the routing device.

If a match is found by the secondary search at 210, the data flow may be repaired at 216. The repair may be accomplished by a redundancy subsystem. In one embodiment, the damaged data flow may be purged and replaced using information from the alternate memory device or alternate memory location. In various embodiments, data flows may be programmed, monitored, and corrected by the redundancy subsystem without user intervention. In various embodiments, throughout the time needed to correct the error, the routing device may continue to route critical traffic, at 214, using the information from the alternate memory device or alternate memory location. In various embodiments, identification and repair of changed data flows may be performed asynchronously.

If the primary search, at 204, and the secondary search, at 208, do not result in a match, a default action may be implemented at 212. The default action may comprise dropping the packet consistent with a deny-by-default security policy. In some embodiments, the packet may be routed to another device (e.g., an SDN controller) for additional analysis. Traffic within an SDN is typically controlled, and as such, packets that do not correspond to a data flow may be indicative of an issue to be addressed. For example, data packets that do not match a data flow may be indicative of the addition of a new host or a need for an additional data flow in the system.

Figure 2B:
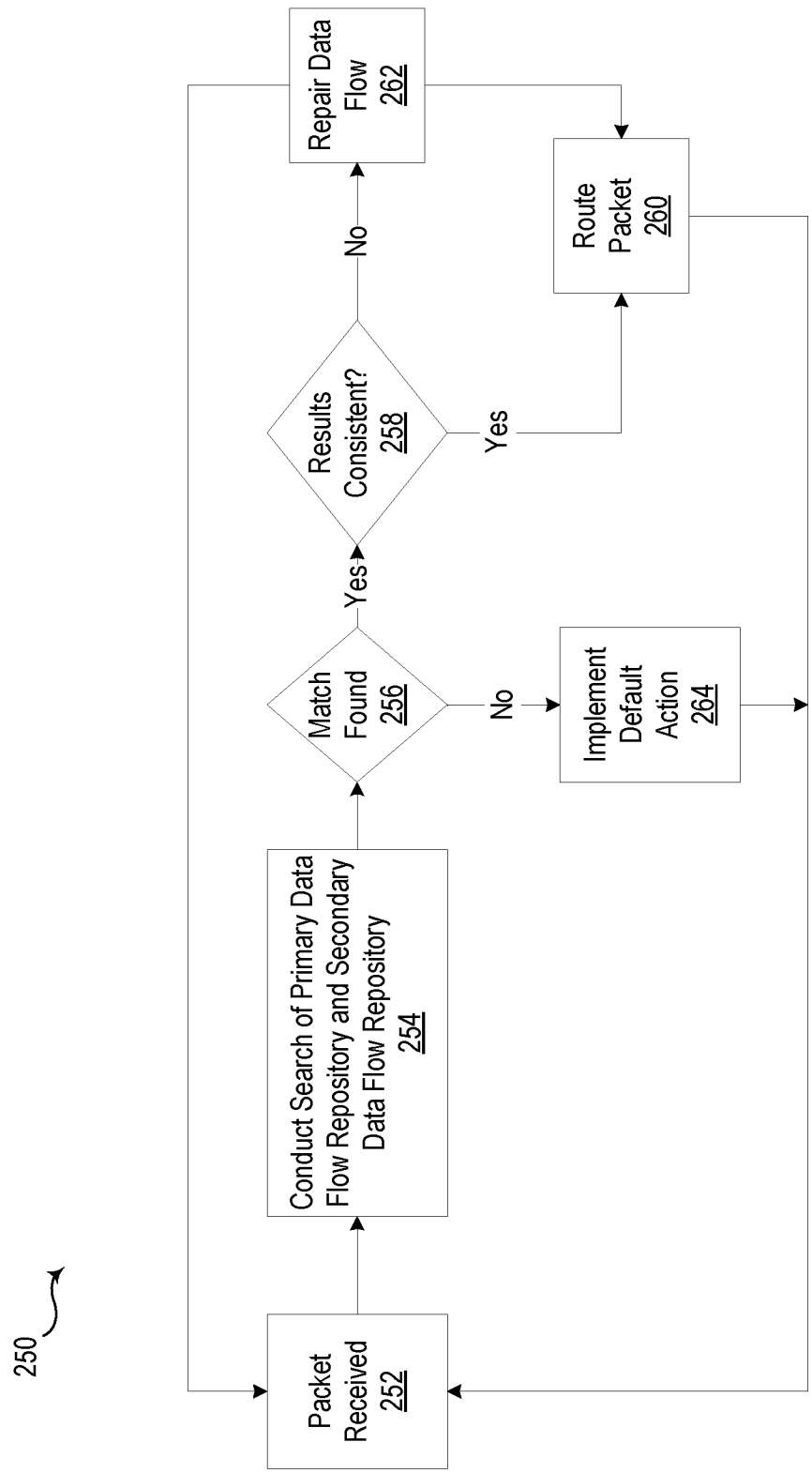
FIG. 2B illustrates a flow chart of another method for improving resilience to SEUs in an SDN consistent with embodiments of the present disclosure.

FIG. 2B illustrates a flow chart of another method 250 for improving resilience to SEUs in an SDN consistent with embodiments of the present disclosure. In contrast to method 200 illustrated in FIG. 2A, method 250 searches both the primary and secondary data repositories in a single step. In various embodiments, the primary and secondary flows may be differentiated logically, but stored in a unified data structure, so that a single search covers both the primary repository and the secondary repository. In one specific embodiment, the primary and secondary data flows may be interleaved such that associated flows are grouped together. Such embodiments may provide improved performance and minimal change in behavior when falling back to a secondary flow because only one search may be executed, and related flows may be associated to increase performance.

At 252, a data packet may be received, and the primary data flow repository and the secondary data flow repository may be searched at 254. At 256, method 250 may determine if a matching data flow was found in the search. If no matching data flow was found, the default action (e.g., dropping the packet, forwarding the packet to an SDN controller, etc.) may be implemented at 264.

At 258, method 250 may determine whether the search of the primary data flow repository and the secondary data flow repository are consistent. Inconsistent search results (e.g., identifying a data flow in the secondary repository but not the primary repository) may indicate that a data flow has been changed. As such, at 262, the affected data flow may be repaired. The packet may be routed, at 260, based on the matching data flow.

Figure 3:
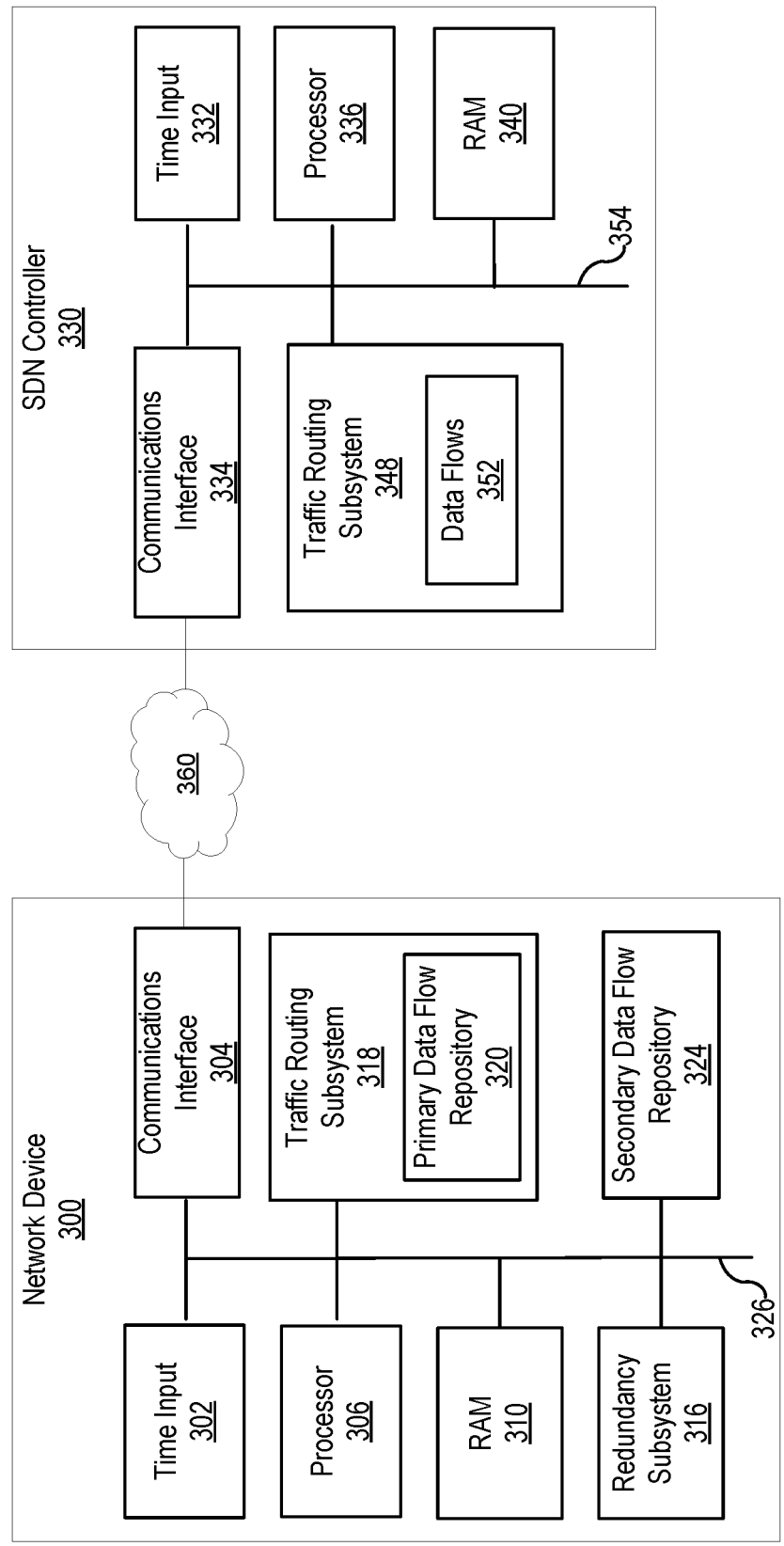
FIG. 3 illustrates a functional block diagram of a system comprising a network device and an SDN controller consistent with embodiments of the present disclosure.

FIG. 3 illustrates a functional block diagram of a system comprising a network device 300 and an SDN controller 330 consistent with embodiments of the present disclosure. Network device 300 may be implemented using hardware, software, firmware, and/or any combination thereof. Moreover, certain components or functions described herein may be associated with other devices or performed by other devices. In various embodiments, the network device 300 may be embodied as an SDN switch or other device for routing data packets in an SDN data plane. The specifically illustrated configuration is merely representative of one embodiment consistent with the present disclosure.

Network device 300 and SDN controller 330 include communications interfaces 304 and 334, respectively. The communications interfaces 304 and 334 may be in communication with other devices (not shown) through a network 360. In various embodiments, communications interfaces 304 and 334 may be embodied as Ethernet ports, fiber optic ports, SONET ports, or other technologies used to transmit data packets.

Network device 300 and SDN controller 330 may further include a time input 302 and 332, which may be used to receive a time signal (e.g., a common time reference) allowing network device 300 and SDN controller 330 to utilize a common time reference. In certain embodiments, a common time reference may be received via communications interfaces 304 and 334, and accordingly, a separate time input may not be required. One such embodiment may employ the IEEE 1588 protocol. Data buses 326 and 354 may facilitate communication among various components of network device 300 and SDN controller 330, respectively.

Processors 306 and 336 may process communications received via the communications interfaces 304 and 334 and coordinate the operation of the other components of network device 300 and SDN controller 330, respectively. Processors 306 and 336 may operate using any number of processing rates and architectures. Processors 306 and 336 may be configured to perform any of the various algorithms and calculations described herein. Processors 306 and 336 may be embodied as a general-purpose integrated circuit, an application-specific integrated circuit, an FPGA, and/or any other suitable programmable logic device. Instructions to be executed by processors 306 and 336 may be stored in random access memory (RAM) 310 and 340, respectively.

A traffic routing subsystem 318 of the network device 300 may process the data packets received via communications interface 304 and route such communications based on applicable data flows. The data flows may be stored in a primary data flow repository 320. The primary data flow repository 320 may comprise a variety of types of computer-readable media. In one embodiment, the primary data flow repository 320 may be embodied as storage in an FPGA.

In addition to the primary data flow repository 320, a secondary data flow repository 324 may include all or a subset of the data flows used by network device 300. In other embodiments, additional repositories (e.g., a tertiary data flow, a quaternary data flow, etc.) may also be utilized. Further, the secondary data flow may be stored by or received from another source, such as the SDN controller 330 and/or an application (e.g., applications 110a-c illustrated in FIG. 1).

The secondary data flow repository 324 and the primary data flow repository 320 may be embodied in different computer-readable media, as illustrated, or embodied in separate locations of a unitary computer-readable medium. The secondary data flow repository 324 may be used to replace any data flows in the primary data flow repository 320 that become corrupted due to an SEU or other event.

A traffic routing subsystem 348 of SDN controller 330 may be used to generate data flows 352 implemented by the network device 300. Data flows 352 may be specified using a variety of criteria, such as source or destination IP address, source or destination MAC address, traffic type, traffic priority, etc.

A redundancy subsystem 316 may detect and correct changes to data flows in the primary data flow repository 320. In some embodiments, changes may be detected in the manner illustrated in FIG. 2, namely, conducting a primary search using a primary data flow repository, finding no match, conducting a secondary search using a secondary data flow repository, finding a match, and repairing the primary data flow repository using the matched communication flow from the secondary data flow repository. In other embodiments, other techniques for identifying changes resulting from SEUs may be utilized. For example, error correction coding may be used to detect and repair changes. In other embodiments, data flows in the primary data flow repository may be periodically compared to data flows in the secondary data flow repository. In still other embodiments, cyclical redundancy checks or other types of data verification may be utilized to identify changes to communication flows in the primary data flow repository.

Upon detection of a change, the corrupted configuration information be may purged and replaced using information from the secondary data flow repository 324. When a change is detected, the redundant information from the secondary data flow repository 324 may be used to route data, thus ensuring that network device 300 continues to route traffic.

FIG. 4 illustrates a plurality of data flows 400 that may be implemented in a network device and may permit selective inclusion of data flows in a secondary repository consistent with embodiments of the present disclosure. In the illustrated embodiment, data flow 1 provides that any data packet received on ingress port 1 is forwarded to port 10. In various embodiments, such a device may include, for example, an IED configured to monitor an aspect of an electric power transmission and distribution system. Data flow 1 is designated for inclusion in the secondary repository, and as such, if a change to data flow 1 occurs, a redundancy subsystem may purge and replace data flow 1 using information from the secondary repository.

Data flow 2 provides that information received from a device having a specific MAC address and destined for a device having a specific MAC address is forwarded to port 2. Data flow 2 is also designated for inclusion in the secondary repository. In various embodiments, a user may specify which data flows are to be included in the secondary repository in various ways. For example, a user may specify which data flows to include using checkboxes, radio buttons, or other selection indicators when creating rules.

Data flow 3 provides that information received from a device having a particular IP address is to be forwarded to a specific destination IP address. Unlike data flow 1 and data flow 2, data flow 3 is not designated for inclusion in the secondary repository.

Data flow 4 provides that any packet received on ingress port 3 in the Generic Object Oriented Substation Events (GOOSE) format be forwarded to port 8. In various embodiments, specific service types (e.g., GOOSE messages) may be identified for inclusion in the secondary repository.

Data flow 5 provides that any packet that does not meet the criteria of data flows 1-4 is dropped. The deny-by-default setting implemented by rule 5 adds security by disallowing any communications that are not encompassed by existing rules. The deny-by-default policy implemented by data flow 5 prevents unauthorized communication from occurring on the network and permits operators of the network to identify changes in network traffic.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A network device to route data packets in a software-defined network (SDN), the network device comprising:
    a communications interface to receive and transmit a data packet;
    a primary data flow repository to store a plurality of communication flows to be used to route the data packet within a data plane of the SDN;
    a redundant data flow repository to store at least a subset of communication flows also stored in the primary data flow repository;
    a traffic routing subsystem to:
        search the plurality of communication flows in the primary data flow repository based on a criteria associated with the data packet;
        determine that none of the plurality of communication flows satisfy the criteria;
        search the redundant data flow repository based on the criteria associated with the data packet;

identify at least one of the subset of communication flows in the redundant data flow repository that satisfies the criteria; and route the data packet within the data plane of the SDN via the communications interface and based on the at least one of the subset of communication flows that satisfies the criteria; and a redundancy subsystem to:

duplicate the at least one of the subset of communication flows that satisfies the criteria from the redundant data flow repository to the primary data flow repository.

2. The network device of claim 1, further comprising a first non-transitory computer-readable storage medium to store the primary data flow repository.

3. The network device of claim 2, further comprising a second non-transitory computer-readable storage medium to store the redundant data flow repository.

4. The network device of claim 2, wherein the primary data flow repository and the redundant data flow repository each comprise a logical differentiator within a unified data structure.

5. The network device of claim 1, wherein a field-programmable gate array comprises at least one of the primary data flow repository or the redundant data flow repository.

6. The network device of claim 1, wherein the redundancy subsystem is further to skip, mark as corrupted, repair in place, or deactivate from the primary data flow repository a changed version of the at least one of the subset of communication flows that satisfies the criteria.

7. The network device of claim 6, wherein the changed version resulted from a single event upset.

8. The network device of claim 1, wherein the network device comprises a switch in the SDN.

9. The network device of claim 1, further comprising an interface to allow a user to select the subset of communication flows stored in the redundant data flow repository.

10. The network device of claim 1, wherein a user is to identify a service type and the redundancy subsystem is to select the subset of communication flows stored in the redundant data flow repository based on the service type.

11. A method for routing data packets in a software-defined network (SDN), the method comprising:

receiving a data packet;

searching a plurality of communication flows in a primary data flow repository configured to store a plurality of communication flows to be used to route the data packet within a data plane of the SDN based on a criteria associated with the data packet;

determining that none of the plurality of communication flows satisfy the criteria;

searching a subset of the plurality of communication flows in a redundant data flow repository of a network device to route data packets in data plane of the SDN, the subset of the plurality of communication flows also being stored in the primary data flow repository, based on the criteria associated with the data packet;

identifying at least one of the subset of the communication flows that satisfies the criteria;

routing the data packet within the data plane based on the at least one of the subset of communication flows that satisfies the criteria; and duplicating the at least one of the subset of communication flows that satisfies the criteria from the redundant data flow repository to the primary data flow repository.

12. The method of claim 11, further comprising storing the primary data flow repository in a first non-transitory computer-readable storage medium.

13. The method of claim 12, further comprising storing the redundant data flow repository in a second non-transitory computer-readable storage medium.

14. The method of claim 12, wherein the primary data flow repository and the redundant data flow repository each comprise a logical differentiator within a unified data structure.

15. The method of claim 11, wherein a field-programmable gate array comprises at least one of the primary data flow repository or the redundant data flow repository.

16. The method of claim 11, further comprising one of skipping, marking as corrupted, repairing in place, or deactivating from the primary data flow repository a changed version of the at least one of the subset of communication flows that satisfies the criteria.

17. The method of claim 16, wherein the changed version resulted from a single event upset.

18. The method of claim 11, further comprising using a switch in the SDN to implement the method.

19. The method of claim 11, further comprising selecting the subset of communication flows stored in the redundant data flow repository using an interface.

20. The method of claim 11, further comprising selecting the subset of communication flows stored in the redundant data flow repository based on a service type specified by a user.

21. A software-defined network (SDN) switch resilient to single event upsets, the switch comprising:

a communications interface to receive and transmit a plurality of data packets;

a primary data flow repository to store a plurality of communication flows to be used to route a plurality of received data packets within a data plane of the SDN;

a redundant data flow repository to store at least a subset of communication flows also stored in the primary data flow repository; and a redundancy subsystem to:

detect a changed communication flow stored in the primary data flow repository;

identify a communication flow stored in the redundant data flow repository corresponding to the changed communication flow stored in the primary data flow repository; and replace the changed communication flow in the primary data flow repository with the corresponding communication flow stored in the redundant data flow repository.

22. The SDN switch of claim 21, wherein the redundancy subsystem detects the changed communication flow stored in the primary data flow repository based on an error correction coding scheme.

23. The SDN switch of claim 21, wherein the subset of communication flows stored in the redundant data flow repository is received from one of an SDN controller and an application.

* * * * *